United States Patent [19]
Murry

[11] Patent Number: 5,110,264
[45] Date of Patent: May 5, 1992

[54] VARIABLE SPEED TURBO VACUUM PUMP

[75] Inventor: Roger P. Murry, San Pedro, Calif.

[73] Assignee: Allied-Signal Inc., Morris Township, Morris County, N.J.

[21] Appl. No.: 487,999

[22] PCT Filed: Dec. 20, 1989

[86] PCT No.: PCT/US89/05734
§ 371 Date: Feb. 13, 1990
§ 102(e) Date: Feb. 13, 1990

[87] PCT Pub. No.: WO91/09230
PCT Pub. Date: Jun. 27, 1991

[51] Int. Cl.⁵ ............................................. F04D 27/00
[52] U.S. Cl. .......................................... 417/45; 417/18; 417/44; 417/45; 417/53; 417/205; 417/243; 318/432
[58] Field of Search ...................... 417/1, 2, 17, 18, 22, 417/42, 44, 45, 53, 205, 243, 432

[56] References Cited

U.S. PATENT DOCUMENTS

| 4,105,372 | 8/1978 | Mishina et al. | 417/243 |
| 4,125,345 | 11/1978 | Yoshinagha et al. | 417/243 |
| 4,525,125 | 6/1985 | Matsumoto et al. | 417/44 |
| 4,878,813 | 11/1989 | Miki | 417/2 |

FOREIGN PATENT DOCUMENTS

| 43281 | 3/1980 | Japan | 417/45 |
| 0063394 | 4/1984 | Japan | 417/45 |
| 2134326 | 8/1984 | United Kingdom | 417/45 |

Primary Examiner—Richard A. Bertsch
Assistant Examiner—David W. Scheuermann
Attorney, Agent, or Firm—David B. Abel; Terry L. Miller; Robert A. Walsh

[57] ABSTRACT

A variable speed turbo vacuum pump system (10) utilizes a motor driven compressor (12) to evacuate a gaseous medium from an enclosed space (22). The compressor (12) is a rotational type having at least one compressor wheel (40), the rotational speed of which is increased in inverse proportion to the decreasing inlet density of the gaseous medium from within the enclosed space (22).

20 Claims, 4 Drawing Sheets

VARIABLE SPEED TURBO VACUUM PUMP

BACKGROUND OF THE INVENTION

The present invention generally relates to the field of vacuum pumps useful to evacuate an enclosed space. More particularly, the invention details a vacuum pump which incorporates a variable speed motor rotationally driving a compressor. The motor is electronically controlled to increase in speed in inverse proportion to the density of the air or gas being evacuated from the enclosed space. Thereby, the compressor and motor operate at maximum efficiency, reducing the evacuation time and energy requirements.

The most common types of vacuum pumps are designed for constant displacement and/or constant speed operation. These vacuum pumps are designed to have a peak efficiency at a selected inlet and outlet air or gas density. During the time interval required to evacuate an enclosed space, these vacuum pumps operate at the peak efficiency for only a brief time. During the majority of the evacuation interval, the constant displacement constant speed vacuum pumps are not operating efficiently, requiring longer evacuation intervals and higher amounts of power. Furthermore, the weight and bulk of these types of vacuum pumps is adversely affected.

Additionally, current vacuum pumps generally utilize oil or a liquid lubricant for reducing friction and wear within moving components. For some applications, these lubricants may be a source of contamination for the air being evacuated from the enclosure. When the air is being exhausted to a clean environment, contamination is not acceptable. Thus it would be desirable to eliminate the necessity for liquid lubricants where there is a potential for contamination.

It is therefore an object of the present invention to provide a vacuum pump which operates efficiently throughout the evacuation interval. A further object of the invention is to provide a vacuum pump which does not require liquid lubricants which may potentially contaminate the evacuated exhaust stream.

SUMMARY OF THE INVENTION

The vacuum pump system of the present invention basically consists of a motor driven compressor, aftercoolers, an electronic controller, a shutoff valve, a check valve and interconnecting plumbing and wiring. A coolant or heat sink medium is also required for circulation through the aftercoolers to remove the heat of compression. The system is particularly designed and described for use in evacuating an airlock on a space station, and recovery of the air therefrom.

In operation, the electronic controller controls the current to the motor driven compressor at a constant level to develop constant drive torque. The resulting compressor speed depends on the density of the air at the inlet and the discharge pressure. On initial run-up in a simple pumpdown cycle from a chamber pressurized to 14.7 pounds per square inch (psia) the rotor rapidly reaches approximately 25 to 40 percent of the design speed before the motor, running at design current, is fully loaded. As the evacuation progresses, the rotor accelerates as $1/\sqrt{p_{in}}$, where $p_{in}$ is the inlet air density. The compressor design speed thus matches the density at the airlock final pumpdown pressure.

DETAILED DESCRIPTION OF THE PREFERRED EMBODIMENT

Figure 1:
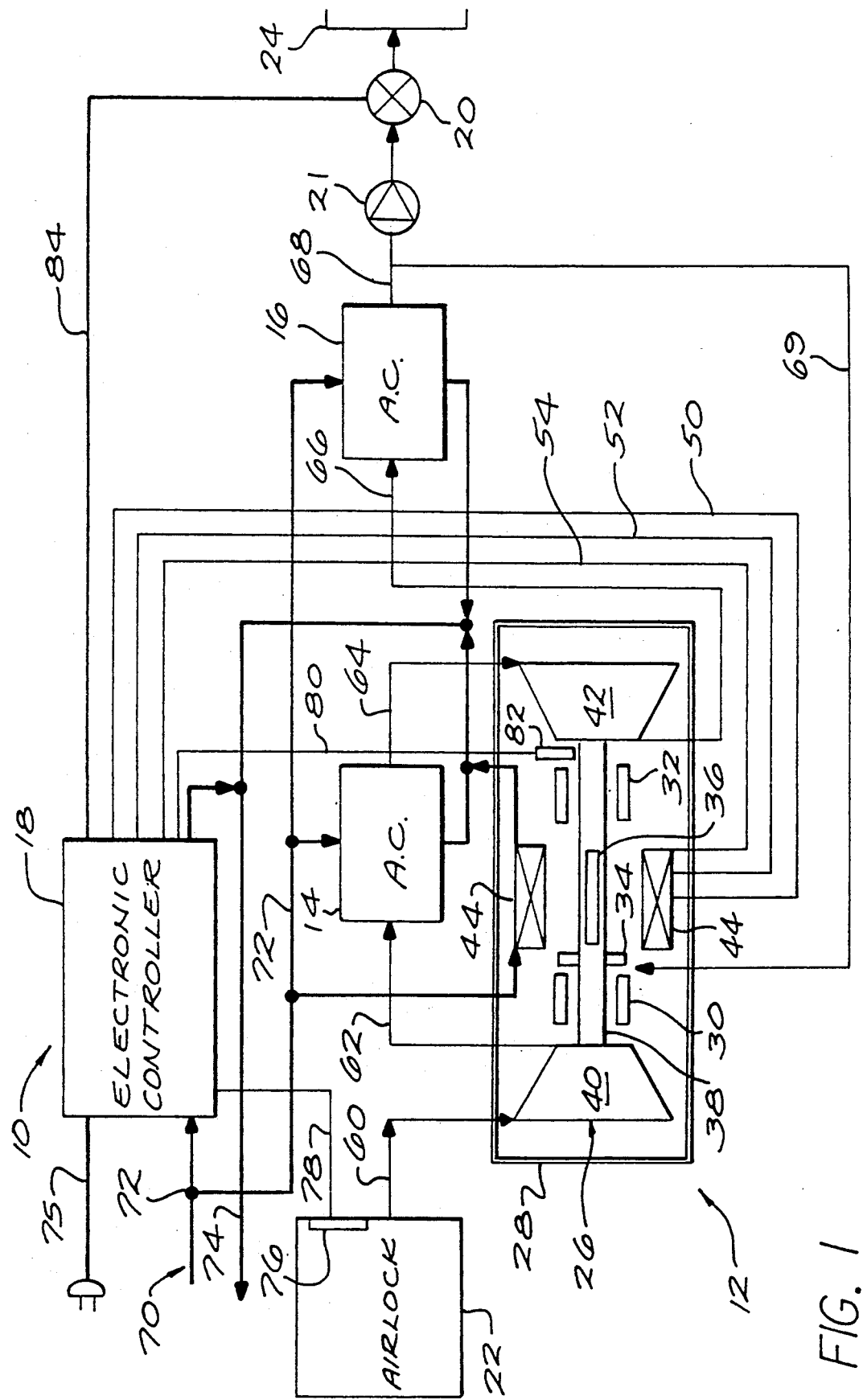
FIG. 1 is a schematic representation of the vacuum pump system of the present invention.

The variable speed vacuum pump system 10 is depicted schematically in FIG. 1. The vacuum pump system 10 includes a two stage motor driven compressor 12, a pair of aftercoolers 14, 16, an electronic controller 18, a shutoff valve 20, and a check valve 21. The system 10 also includes conduits, ducts, and electrical wiring interconnecting the various elements of the system 10 as described herein below. The system 10 is designed to evacuate an enclosed space or airlock 22, exhausting the air or gas therefrom to a second enclosed space or ambient 24 at a fixed ambient pressure.

The two stage motor driven compressor 12 preferably includes a rotating assembly 26 mounted within a housing 28 and supported by foil bearings 30, 32 and 34. The rotating assembly 26 preferably includes a permanent magnet rotor 36 integrally mounted within a shaft 38. The shaft 38 is also connected to a pair of compressor wheels 40, 42 mounted at opposite ends of the shaft 38. A stator assembly 44 is disposed about the permanent magnet rotor 36 of shaft 38, and is also contained within the housing 28. The stator assembly 44 preferably includes three phase windings 46a, 46b, 46c (not detailed). Each of the phase windings 46a, 46b, 46c is electrically connected to the electronic controller 18 by wires 50, 52 and 54 respectively.

For evacuating air from the air lock 22, the airlock 22 is connected via an intake duct 60 to the inlet of the first compressor wheel 40. The compressed air exiting the first compressor 40 is routed via duct 62 to the first aftercooler 14, then via duct 64 to the second compressor 42. Downstream of compressor 42 the air is routed to the second aftercooler 16 via duct 66, and subsequently to the second enclosed space or ambient 24 via exhaust duct 68. The exhaust duct 68 may also include a shutoff valve 20 and a check valve 21 to prevent leakage back to the airlock 22. A cooling air supply duct 69 diverts a portion of the exhausted air stream from exhaust duct 68 to the bearings 30, 32 and 34 within the motor driven compressor 12.

The system 10 also includes a coolant circulation system 70. The coolant system 70 preferably circulates a flow of cooling liquid, for example pure water, through the aftercoolers 14 and 16 in heat exchange relationship with the air compressed within the motor driven compressor 12. The coolant system 70 may also provide liquid cooling for the electronic controller 18 and motor driven compressor 12 to dissipate heat generated therein. The coolant circulation system 70 preferably includes coolant supply piping 72 which provides coolant to aftercoolers 14, and 16, as well as to motor 12 and electronic controller 18. A coolant return pipe 74 connects to each of these units to return the coolant to an external reservoir (not shown).

Figure 2:
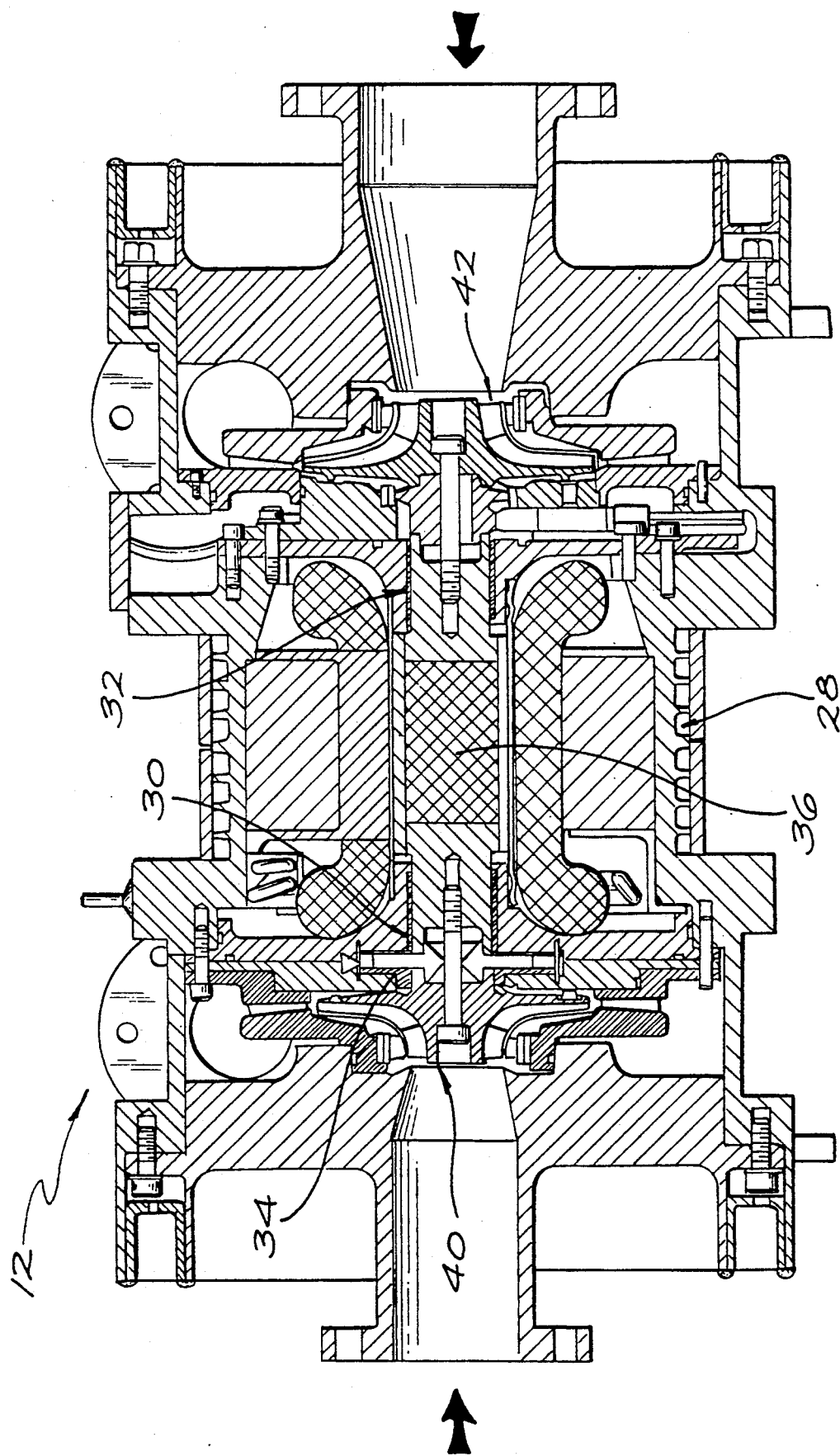
FIG. 2 is a cross sectional view of a preferred design for a motor driven compressor for use in the system of FIG. 1.

A preferred design for the motor driven compressor 12 of FIG. 1 is shown in a cross sectional view in FIG. 2. Within FIG. 2, like components are numbered similarly as in the schematic of FIG. 1. In FIG. 2, the rotating assembly 26, housing 28, foil bearings 30, 32 and 34, permanent magnet rotor 36, shaft 38, compressor wheels 40, 42 and stator assembly 44 are more graphically illustrated. The permanent magnet rotor 36 is described in greater detail within U.S. Pat. No. 4,667,123 herein incorporated by reference. Similarly, the details of the stator assembly 44 are described within U.S. Pat. No. 4,709,180 herein incorporated by reference.

The design and operation of the journal foil bearings 30, 32 which radially support the rotating assembly 26, are described within U.S. Pat. Nos. 4,153,315; 4,435,839 and 4,701,060. The design of the thrust foil bearing 34, which axially supports the rotating assembly 26, is detailed within U.S. Pat. Nos. 4,624,583 and 4,668,106. These foil bearing patents are assigned to the assignee of the present invention and the descriptions therein are herein incorporated by reference.

The electronic controller 18 of FIG. 1 is connected to a source of electrical power (not shown) by power cable 75, as well as to a command switch panel 76 via a data cable 78. The command switch panel 76 may be located within the air lock 22, or alternatively at a location external to the air lock 22. The electronic controller 18 is also electrically connected via cable 80 to a sensor 82 within the motor driven compressor 12 which provides position and rotational speed information concerning the rotating assembly 26. The information from the sensor 82 is used during start-up to enable commutation of the phase windings 46a, 46b and 46c. The electronic controller 18 is further additionally electrically connected to power and control the shutoff valve 20 via electrical cable 84.

In operation, the electronic controller 18 controls the current to the motor driven compressor 12 at a constant level to develop constant drive torque. The resulting compressor speed depends on the density of the air at the inlet and the discharge pressure. On initial run-up in a simple pumpdown cycle from a chamber pressurized to 14.7 pounds per square inch (psia) the rotor rapidly reaches approximately 25 to 40 percent of the design speed before the motor, running at design current, is fully loaded. As the evacuation progresses, the rotor accelerates as $1/\sqrt{p_{in}}$, where $p_{in}$ is the inlet air density. The compressor design speed thus matches the density at the airlock final pumpdown pressure.

Figure 3:
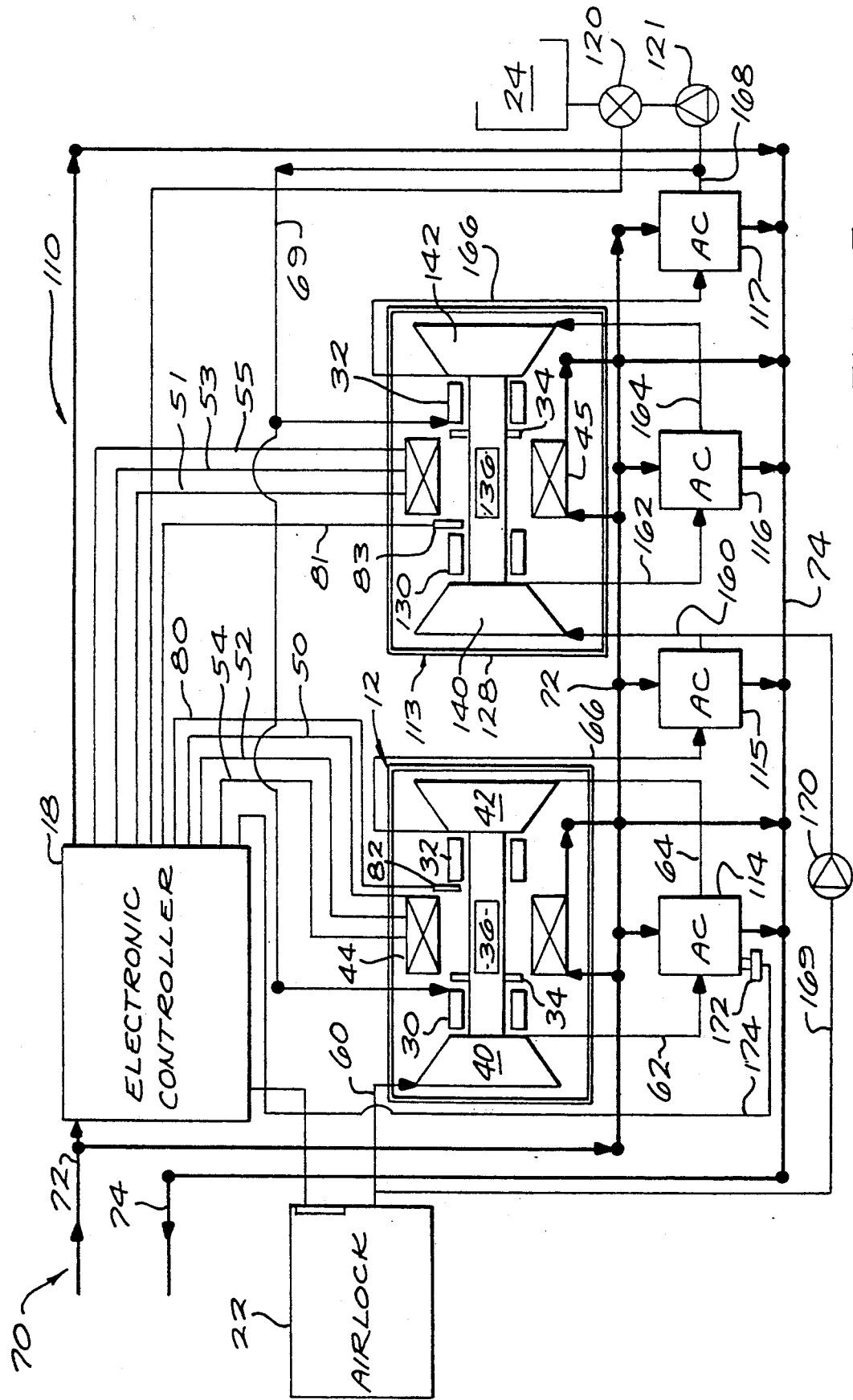
FIG. 3 is a schematic representation of an alternative design for the vacuum pump system incorporating a pair of two stage motor driven compressors.

FIG. 3 schematically depicts an alternative design for a vacuum pump system 110. The system 110 essentially includes a pair of motor driven compressors 112, 113 which are generally similar to the motor driven compressor 12 depicted in FIG. 2. Within FIG. 3, the system 110 generally comprises a pair of the systems as shown in FIG. 1, arranged in a series configuration. Accordingly, within FIG. 3, like elements as shown and described within FIG. 1 and FIG. 2 will be similarly numbered.

The system 110 of FIG. 3 includes the first motor driven compressor 112 configured identically as the compressor 12 of FIGS. 1 and 2. The system 110 further includes a second motor driven compressor 113 which is also substantially identical to the compressor 12 of FIGS. and 2. The system 110 further includes four aftercoolers 114, 115, 116 and 117, electronic controller 18, shutoff valve 120, check valve 121 and associated ducts, wiring and plumbing detailed herein below.

Within the system 110 of FIG. 3 the airlock 22 is connected via an intake duct 60 to the inlet of the first compressor wheel 40 of motor driven compressor 112. The compressed air exiting the first compressor 40 is routed via duct 62 to the first aftercooler 114, then via duct 64 to the second compressor 42. Downstream of compressor 42 the air is routed to the second aftercooler 115 via duct 66, and subsequently to the first stage compressor 140 of the second motor driven compressor 113, via duct 160. The air is then directed thru duct 162 to the third aftercooler 116 and subsequently thru duct 164 to the second stage compressor 142 of the motor driven compressor 13. The compressed air exiting the motor driven compressor 113 is routed via duct 166 to the fourth aftercooler 117 and subsequently through exhaust duct 168 to the second enclosure or ambient 24. The system 110 may also include a bypass duct 169 which directs the air flow past the first motor driven compressor 112 and aftercoolers 114 and 115, directly to the first stage compressor 140 of the second motor driven compressor 113. The bypass duct 169 may also include a check valve 170 to prevent leakage back to the airlock.

The electronic controller 118 of FIG. 3 is similarly configured as in FIG. 1, and additionally is electrically connected to control commutation of stators 144, and 145 of motor driven compressors 112, 113 respectively. In addition to the wires 50, 52, 54 connecting the electronic controller 118 to the phase windings 46a, 46b, 46c of the stator 44 of the first motor driven compressor 112, the electronic controller 118 is connected by wires 51, 53, 55 to phase windings 47a, 47b, 47c (not detailed) of the stator assembly 45 of the second motor driven compressor 113. Additionally cables 80 and 81 are connected to rotor position sensors 82 and 83 within the compressors 112 and 113 respectively.

Figure 4:
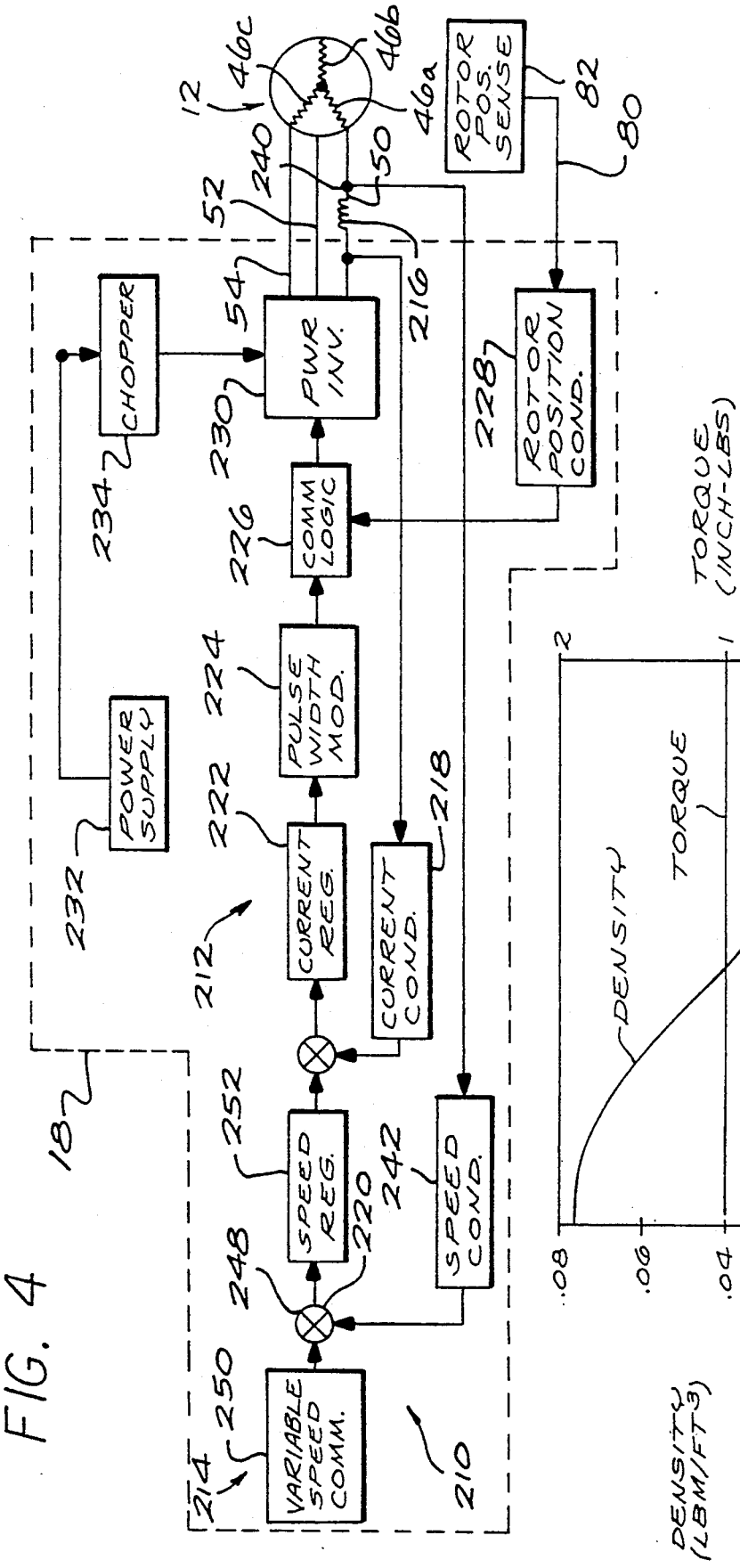
FIG. 4 is a schematic representation of the electronic controller and electrical circuitry of the system of FIG. 1.

FIG. 4 schematically depicts a functional block diagram of the servo-control system 210 of the electronic controller 18 or 118 of FIGS. 1 and 3. Since the operation of these controllers is essentially similar, the following description will be referenced to FIG. 1 and controller 18, while it is to be understood that the operation of controller 118 of FIG. 3 is analogous. The basic function of the electronic controller 18 is to power and commutate the motor driven compressor 12 at an accelerating speed during operation of the vacuum pump system 10. The servo control system 210 therefor includes a current loop 212 and a speed loop 214.

Within the current loop 212, the output current to the motor 12 is sensed by a coil 216 proximate one of the wires 50, 52 or 54. The current signal from coil 216 is passed to a current conditioner 218 to produce a current feedback signal which is transmitted to a current command summer 220. The current summer 220 also receives a signal from the speed loop 214 which is combined to produced a signal which is directed to a current regulator 222. The signal from the current regulator 222 is forwarded to a pulse width modulator 224, then to a commutation logic sequencer 226. The commutation logic sequencer 226 also receives a rotor position input signal from the sensor 82, within the motor driven compressor 12, via a signal conditioner 228. The two input signals to the commutation logic sequencer 226 are combined at low speeds to provide commutation logic signals to a power inverter 230.

The servo control 210 receives input power from a power supply 232. The input power is preferably supplied at 120 volts direct current (VDC). Within the servo control 210, the input power is first sent through a chopper circuit 234, which segments and distributes the input power to a plurality of terminals within the power inverter 230. Within the power inverter 230, the commutation logic signals direct the chopped or segmented input power to the appropriate stator phase winding 46a, 46b, and/or 46c via wires 50, 52, and 54 respectively. The segmented input power energizes the phase windings 46 creating an electromagnetic force which induces rotation of the permanent magnet rotor 36, and thereby the rotating assembly 26 of FIG. 1.

During relatively higher speed operation of the motor driven compressor 12, the rotor position sensor 82 does not provide an accurate output signal. Thus, at higher speeds, the speed loop 214 provides a feedback signal to control commutation of the input power. Within the speed loop 214, the rotational position of the rotating assembly 26 is determined by sensing the back electromotive force (emf) on one of the phase winding lead wires 50, with an emf sensor 240. The back emf signal is forwarded to a speed conditioning filter circuit 242, to provide a speed feedback signal to a speed summer 248. The speed summer 248 also receives a signal from a variable speed command console 250, and processes the two speed signals for input to a speed regulator 252. An output signal from the speed regulator 252 is combined with the current feedback signal of the current loop 212 within the current command summer 220.

Figure 5:
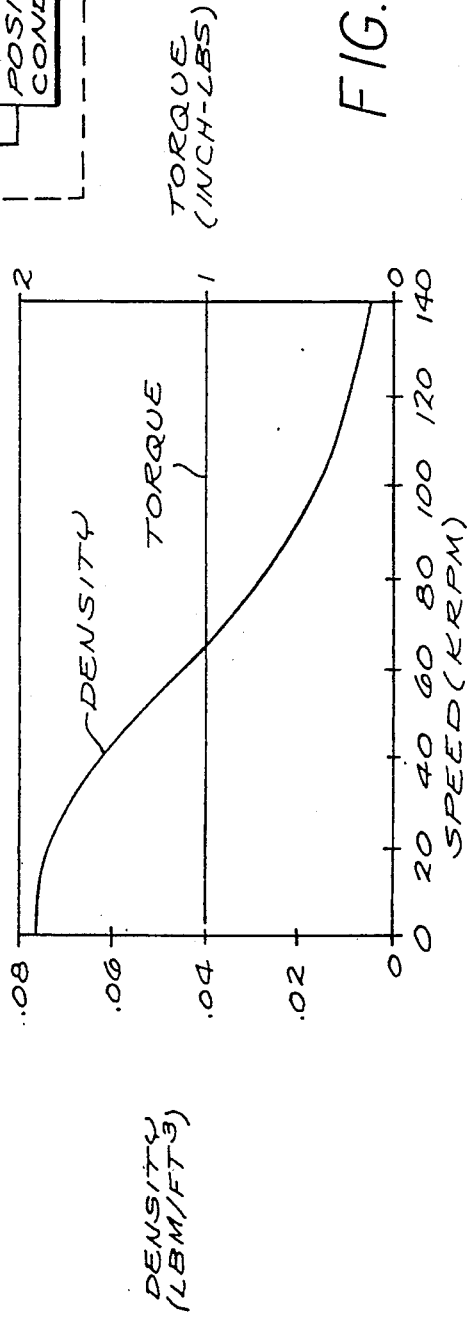
FIG. 5 is a graphical representation of motor speed and torque as a function of inlet gas density.

This dual arrangement of using the rotor position sensor 82 to provide low speed rotor position feedback and the back emf sensor 240 to provide high speed rotor position feedback, allows the commutation rate to be increased such that the rotating assembly accelerates smoothly to a maximum design speed. The operation of this dual arrangement to control the system 10 is shown in FIG. 5, which graphically depicts the decrease in density of the air being evacuated plotted against increasing rotational speed at the rotating assembly 26 of the motor driven compressor 12. The graph also depicts the constant torque output of the motor driven compressor 12 with increasing speed. These two curves depict the unique operation of the vacuum pump system of the present invention, which allows the system to operate efficiently throughout the evacuation cycle. Thereby, the vacuum pump systems weight, power consumption, and cycle duration have been reduced by as much as 50 percent over vacuum pumps of the prior art.

The vacuum pump system 10 thus provides a method of evacuating a gaseous medium such as air from the enclosed space 22. The method contemplates evacuating the gaseous medium from within the enclosed space 22 by ducting the enclosed space 22 to the motor driven compressor 12 operative to compress the gaseous medium from a first inlet pressure and density to a second exhaust pressure and density. The system 10 controls the rotational speed of the compressor 12 with the electronic controller 18 which provides a constant current commutated power supply to the compressor 12. The controller 18 thereby controls the rotational speed of the compressor 12 to increase in inverse proportion to the decreasing density of the gaseous medium within the enclosed space 22. The method further contemplates dissipating the heat of compression from the gaseous medium downstream of the compressor 12 within the aftercoolers 14, 16, which may be cooled by a circulating coolant. During evacuation within the motor driven compressor 12, the rotating assembly 26 including the rotor assembly 36 and compressors 40, 42 are rotationally driven by commutating electric power to the three phase stator assembly 44. A preferred embodiment includes the first compressor 40 and the second compressor 42 attached for driven rotation to the rotor 36. The first compressor 40 and the second compressor 42 are contained within the housing assembly 28, and arranged such that the gaseous medium is first compressed within the first compressor 40 and subsequently further compressed within the second compressor 42.

In order to increase the efficiency of the system 10, the preferred method further contemplates inducting and compressing the gaseous medium within the first compressor 40 rotationally driven by the rotor assembly 36, then cooling the gaseous medium within the aftercooler 14 in heat exchange relationship with the cooling fluid. The gaseous medium is then further compressed within the second compressor 42 which is also rotationally driven by the rotor assembly 36, and exhausted from the second compressor 42. When the temperature of the exhausted gases is critical, the gaseous medium can be cooled within a second aftercooler 16 downstream of the second compressor 42 in heat exchange relationship with the cooling fluid.

The system 110 of FIG. 3 allows evacuation to lower absolute pressures by including the second motor driven compressor 112 and rotationally driving the second rotating assembly 136 and at least one compressor 140 by commutating electric power to the second three phase stator assembly 45. Preferably, the system of FIG. 3 provides the third compressor 140 and the fourth compressor 142 attached for driven rotation to the second rotor 136. The third compressor 140 and the fourth compressor 142 are contained within the second housing assembly 128, and arranged such that the gaseous medium is compressed within the third compressor 140 and subsequently further compressed within the fourth compressor 142. This four stage compression enables the system 110 to achieve an evacuated pressure of 0.5 psi when pumping to a 14.7 psi ambient environment.

The system 110 of FIG. 3 further contemplates compressing the gaseous medium within the third compressor 140, cooling the gaseous medium within the aftercooler 116 in heat exchange relationship with a cooling fluid, then further compressing the gaseous medium within the fourth compressor 142 before exhausting the gaseous medium from the fourth compressor 142 to an ambient location. As in FIG. 1, when the outlet temperature is important the gaseous medium can be cooled within the aftercooler 117 downstream of the fourth compressor 142 in heat exchange relationship with the cooling fluid.

It should be evident from the foregoing description that the present invention provides many advantages over available vacuum pumps. Although preferred embodiments are specifically illustrated and described herein, it will be appreciated that many modifications and variations of the present invention are possible in light of the above teaching to those skilled in the art. It is preferred, therefore, that the present invention be limited not by the specific disclosure herein, but only by the appended claims.

I claim:

1. A vacuum pump system (10), comprising:
   motor driven compressor means (12) including a drive motor having a characteristic proportionality of drive torque to current at all speeds, and a dynamic compressor for compressing a gaseous medium from a first inlet pressure and density to a second exhaust pressure and density; and
   electronic controller means (18) for monitoring the rotational speed of said compressor means (12), and for providing a constant current commutated power supply to said compressor means (12), said controller means (18) thereby causing the rotational speed of said compressor means (12) to increase in inverse proportion to the inlet density of said gaseous medium.

2. The vacuum pump system (10) of claim 1 further comprising:
   aftercooler means (14, 16) for dissipating the heat of compression from said gaseous medium downstream of said compressor means (12).

3. The vacuum pump system (10) of claim 2 wherein said compressor means (12) further comprises:
   a housing assembly (28) containing a three phase stator assembly (44) and a permanent magnet rotor (36) mounted within said housing assembly (28), said rotor (36) attached to and rotationally driving at least one compressor (40).

4. The vacuum pump system (10) of claim 3, wherein said compressor means (12) further comprises:
   a first compressor (40) and a second compressor (42) attached for driven rotation to said rotor (36), said first compressor (40) and said second compressor (42) contained within said housing assembly (28), and arranged such that the gaseous medium is first compressed within said first compressor (40) and subsequently further compressed within said second compressor (42).

5. The vacuum pump system (10) of claim 4 further comprising:
   first duct means (60) for delivering said gaseous medium from a source thereof to said first compressor (40);
   second duct means (62) for conducting said gaseous medium from said compressor (40) to said first aftercooler means (14);
   third duct means (64) for conducting said gaseous medium from said first aftercooler means (14) to said second compressor (42); and
   exhaust duct means (68) for exhausting said gaseous medium from said system (10).

6. The vacuum pump system (10) of claim 5 further comprising:
   fourth duct means (66) for conducting said gaseous medium from said second compressor (42) to said second aftercooler means (16).

7. The vacuum pump system (10) of claim 5 further comprising:
   valve means (20, 21) for shutting of the flow of compressed gaseous medium and for preventing leakage thereof back through said system (10).

8. The vacuum pump system (10, 110) of claim 4 wherein said compressor means (12, 112) further comprises:
   a second housing assembly (128) containing a second three phase stator assembly (45) and a second permanent magnet rotor (136) mounted within said second housing assembly (128), said rotor (136) attached to and rotationally driving at least one compressor (140).

9. The vacuum pump system (10, 110) of claim 8, wherein said compressor means (12, 112) further comprises:
   a third compressor (140) and a fourth compressor (142) attached for driven rotation to said second rotor (136), said third compressor (140) and said fourth compressor (142) contained within said second housing assembly (128), and arranged such that the gaseous medium from said second compressor (42) is compressed within said third compressor (140) and subsequently further compressed within said forth compressor (142).

10. The vacuum pump system (10, 110) of claim 9, wherein said aftercooler means further comprises:
    a first aftercooler (114) located within the flowstream of said gaseous medium between said first compressor (40) and said second compressor (42);
    a second aftercooler (115) located within the flowstream of said gaseous medium between said second compressor (42) and said third compressor (140);
    a third aftercooler (116) located within the flowstream of said gaseous medium between said third compressor (140) and said fourth compressor (142);
    a fourth aftercooler (117) located within the exhaust flowstream of said gaseous medium downstream of said fourth compressor (142).

11. A method of evacuating a gaseous medium from an enclosure (22) comprising:
    evacuating said gaseous medium from within said enclosure (22) by ducting (60) said enclosure (22) to a motor driven compressor (12) including a drive motor having a characteristic proportionality of drive torque to current at all speeds and a dynamic compressor operative to compress said gaseous medium from a first inlet pressure and density to a second exhaust pressure and density; and
    controlling the rotational speed of said compressor (12) with an electronic controller (18) which provides a constant current commutated power supply to said compressor (12), said controller (18) thereby controlling the rotational speed of said compressor (12) to increase in inverse proportion to the decreasing density of said gaseous medium within said enclosure (22).

12. The method of claim 11, further comprising:
    dissipating the heat of compression from said gaseous medium downstream of said compressor (12) within an aftercooler (14, 16).

13. The method of claim 12 wherein said evacuating step further comprises:
    rotationally driving a rotating assembly (26) including a rotor assembly (36) and at least one compressor (40) by commutating electric power to a three phase stator assembly (44) mounted within a housing assembly (28).

14. The method of claim 13, further comprising:
    providing a first compressor (40) and a second compressor (42) attached for driven rotation to said rotor (36), said first compressor (40) and said second compressor (42) contained within said housing assembly (28), and arranged such that the gaseous medium is first compressed within said first compressor (40) and subsequently further compressed within said second compressor (42).

15. The method of claim 13, further comprising:
inducting and compressing said gaseous medium within a first compressor (40) rotationally driven by said rotor assembly (36);
cooling said gaseous medium within an a aftercooler (14) in heat exchange relationship with a cooling fluid;
further compressing said gaseous medium within a second compressor (42) rotationally driven by said rotor assembly (36); and
exhausting said gaseous medium from said second compressor (42).

16. The method of claim 13, further comprising:
cooling said gaseous medium within a second aftercooler (16) downstream of said second compressor (42) in heat exchange relationship with a cooling fluid.

17. The method of any of claims 12 to 16 further comprising:
rotationally driving a second rotating assembly (126) including a second rotor assembly (136) and at least one compressor (140) by commutating electric power to a second three phase stator assembly (144) mounted within a second housing assembly (128).

18. The method of claim 17, further comprising:
providing a third compressor (140) and a fourth compressor (142) attached for driven rotation to said second rotor (136), said third compressor (140) and said fourth compressor (142) contained within said second housing assembly (128), and arranged such that the gaseous medium is compressed within said third compressor (140) and substantially further compressed within said fourth compressor (142).

19. The method of claim 17, further comprising:
further compressing said gaseous medium within a third compressor (140) rotationally driven by said second rotor assembly (136);
cooling said gaseous medium within an aftercooler (116) in heat exchange relationship with a cooling fluid;
further compressing said gaseous medium within a fourth compressor (142) rotationally driven by said second rotor assembly (136);
cooling said gaseous medium within an aftercooler (117) downstream of said fourth compressor (142); and
exhausting said gaseous medium from said fourth compressor (142).

20. The method of claim 11 wherein the rotational speed of said compressor 12 is increased in proportion to one over the square root of the density of the gaseous medium at the inlet.

* * * * *